(12) United States Patent
Bunker et al.

(10) Patent No.: US 6,984,102 B2
(45) Date of Patent: Jan. 10, 2006

(54) HOT GAS PATH COMPONENT WITH MESH AND TURBULATED COOLING

(75) Inventors: Ronald Scott Bunker, Niskayuna, NY (US); Jeremy Clyde Bailey, Middle Grove, NY (US); Ching-Pang Lee, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 139 days.

(21) Appl. No.: 10/718,003

(22) Filed: Nov. 19, 2003

(65) Prior Publication Data

US 2005/0106020 A1 May 19, 2005

(51) Int. Cl.
*F01D 5/18* (2006.01)
(52) U.S. Cl. ............... 415/115; 416/97 R; 416/241 R; 416/241 B
(58) Field of Classification Search ............... 415/115; 416/97 R, 241 R, 241 B
See application file for complete search history.

(56) References Cited

U.S. PATENT DOCUMENTS

| | | | |
|---|---|---|---|
| 1,848,375 A | 3/1932 | Muir | |
| 2,938,333 A | 5/1960 | Wetzler | |
| 3,229,763 A | 1/1966 | Rosenblad | |
| 3,664,928 A | 5/1972 | Roberts | |
| 3,899,882 A | 8/1975 | Parker | |
| 4,158,949 A | 6/1979 | Reider | |
| 4,184,326 A | 1/1980 | Pane, Jr. et al. | |
| 4,407,632 A | * 10/1983 | Liang | 416/97 R |
| 4,690,211 A | 9/1987 | Kuwahara et al. | |
| 4,838,031 A | 6/1989 | Cramer | |
| 5,353,865 A | 10/1994 | Adiutori et al. | |
| 5,361,828 A | 11/1994 | Lee et al. | |
| 5,370,499 A | 12/1994 | Lee | |
| 5,402,464 A | 3/1995 | Schenk et al. | |
| 5,421,158 A | 6/1995 | Stenger et al. | |
| 5,460,002 A | 10/1995 | Correa | |
| 5,577,555 A | 11/1996 | Hisajima et al. | |
| 5,651,662 A | 7/1997 | Lee et al. | |
| 5,660,525 A | 8/1997 | Lee et al. | |
| 5,681,144 A | 10/1997 | Spring et al. | |
| 5,690,472 A | 11/1997 | Lee | |
| 5,695,321 A | 12/1997 | Kercher | |
| 5,724,816 A | 3/1998 | Ritter et al. | |
| 5,738,493 A | 4/1998 | Lee et al. | |

(Continued)

FOREIGN PATENT DOCUMENTS

EP    1111190    6/2001

(Continued)

OTHER PUBLICATIONS

M. Ya Belen'Kii et al., "Experimental Study of the Thermal and Hydraulic Characteristics of Heat-Transfer Surfaces Formed by Spherical Cavities," II. Polzunova Cent. Scientific Research, Translated from Teplofizika Vysokikh Temperatur, vol.29, No.6, 1992 Plenum Pub. Corp., pp. 928-933.

(Continued)

*Primary Examiner*—Edward K. Look
*Assistant Examiner*—Igor Kershteyn
(74) *Attorney, Agent, or Firm*—Penny A. Clarke; Patrick K. Patnode

(57) ABSTRACT

A component includes at least one wall having an inner portion and an outer portion. A number of pins extend between the inner and outer portions of the wall. The pins define a mesh cooling arrangement having a number of flow channels. A number of turbulators are disposed on at least one of the inner and outer portions of the wall.

29 Claims, 4 Drawing Sheets

U.S. PATENT DOCUMENTS

| | | | |
|---|---|---|---|
| 5,758,503 | A | 6/1998 | DuBell et al. |
| 5,797,726 | A | 8/1998 | Lee |
| 5,822,853 | A | 10/1998 | Ritter et al. |
| 5,933,699 | A | 8/1999 | Ritter et al. |
| 5,975,850 | A | 11/1999 | Abuaf et al. |
| 6,098,397 | A | 8/2000 | Glezer et al. |
| 6,134,877 | A | 10/2000 | Alkabie |
| 6,190,120 | B1 | 2/2001 | Thatcher et al. |
| 6,237,344 | B1 | 5/2001 | Lee |
| 6,334,310 | B1 | 1/2002 | Sutcu et al. |
| 6,402,470 | B1 | 6/2002 | Kvasnak et al. |
| 6,408,629 | B1 | 6/2002 | Harris et al. |
| 6,412,268 | B1 | 7/2002 | Cromer et al. |
| 6,468,669 | B1 | 10/2002 | Hasz et al. |
| 6,494,044 | B1 | 12/2002 | Bland |
| 6,504,274 | B2 | 1/2003 | Bunker et al. |
| 6,526,756 | B2 | 3/2003 | Johnson et al. |
| 6,607,355 | B2 | 8/2003 | Cunha et al. |
| 6,808,367 | B1 * | 10/2004 | Liang ....................... 416/97 R |
| 2003/0086785 | A1 | 5/2003 | Bunker |
| 2003/0203259 | A1 | 10/2003 | Bunker |

FOREIGN PATENT DOCUMENTS

| | | |
|---|---|---|
| JP | 280390 | 12/1986 |
| JP | 8110012 | 4/1996 |
| JP | 217994 | 8/1997 |
| JP | 164901 A | 6/2001 |

OTHER PUBLICATIONS

Belen-kiy et al., "Heat Transfer Augmentation Using Surfaces Formed by a System to Spherical Cavities," ISSN1064-2269/93/0002-0196, Heat Transfer Research, vol. 25, No. 2, 1993, pp. 196-203.

Kesarev et al., "Convective Heat Transfer in Turbulized Flow Past a Hemispherical Cavity," Heat Transfer Research, vol. 25, No. 2, 1993, pp. 156-160.

N. Syred et al., "Effect of Surface Curvature on Heat Transfer and Hydrodynamics within a Single Hemispherical Dimple," Paper No. 2000-GT-236, Proceedings of ASME Turboexpo 2000, May 8-11, 2000, Munich Germany, pp. 1-6.

H. K. Moon et al., "Channel Height Effect on Heat Transfer and Friction in a Dimpled Passage," IGTI Turbo Expo, Paper No. 99-GT-163, Indianapolis, pp. 1-8.

C. Carcasi et al., "Heat Transfer and Pressure Drop Evaluation in Thin Wedge-Shaped Trailing Edge," Paper No. GT-2003-38197, IGTI Turbo Expo, Jun. 16-19 Atlanta, Georgia, pp. 111-122.

M. K. Chyu et al., "Convective Heat Transfer of Cubic Fin Arrays in a Narrow Channel," Journal of Turbomachinery, Apr. 1998, vol. 120, pp. 362-367.

N. Zhang et al., "Heat Transfer and Friction Loss Performance in Flow Networks with Multiple Intersections," Experimental Heat Transfer, vol. 6, 1993. pp. 243-257.

V. N. Afanas'yev et al., "Thermohydraulics of Flow Over Isolated Depressions (Pits, Grooves) in a Smooth Wall," Heat Transfer Research, ISSN 1064-2285/93/0001-0022, vol. 25, No. 1, 1993, pp. 22-56.

Patent Application, Ronald Scott Bunker et al., U.S. Appl. No. 10/462,755, filed Jun. 6, 2002.

Patent Application, Ronald Scott Bunker, U.S. Appl. No. 10/065, 115, filed Sep. 18, 2002.

Patent Application, Ronald Scott Bunker, U.S. Appl. No. 10/064,605, filed Jul. 30, 2002.

Patent Application, Ronald Scott Bunker, U.S. Appl. No. 10/065,495, filed Oct. 24, 2002.

Patent Application, Ronald Scott Bunker et al., U.S. Appl. No. 10/162,756, filed Jun. 6, 2002.

Patent Application, Ronald Scott Bunker, U.S. Appl. No. 10/065,814, filed Nov. 22, 2002.

Patent Application, Ronald Scott Bunker, U.S. Appl. No. 10/301,672, filed Nov. 22, 2002.

Patent Application, Ronald Scott Bunker, U.S. Appl. No. 10/065,108, filed Sep. 18, 2002.

K. Takeishi et al., "Heat Transfer Characteristics Of A Flow Passage With Long Pin Fins And Improving Heat Transfer Coefficient By Adding Turbulence Promoters On A Endwall," Paper No. 2001-GT-178, IGTI Turbo Expo, New Orleans, pp. 1-12.

S. Anzai et al., "Effect of the Shape of Turbulence Promoter Ribs on Heat Transfer and Pressure Loss Characteristics", Bulletin of the Gas Turbine Society of Japan, 1992.

V. N. Afanas'yev et al., "Heat Transfer and Friction on Surfaces Contoured by Spherical Depressions," Heat Transfer Research, vol. 24, No. 1, 1992. pp. 24-105.

V. N. Afanasyev et al., "Turbulent Flow Friction and Heat Transfer Characteristics for Spherical Cavities on a Flat Plate," Experimental Thermal and Fluid Science, 1993, vol. 7, pp. 1-8.

D. E. Metzger et al., "Developing Heat Transfer in Rectangular Ducts with Staggered Arrays of Short Pin Fins", Journal of Heat Transfer, vol. 104, Nov. 1982, pp. 100-706.

* cited by examiner

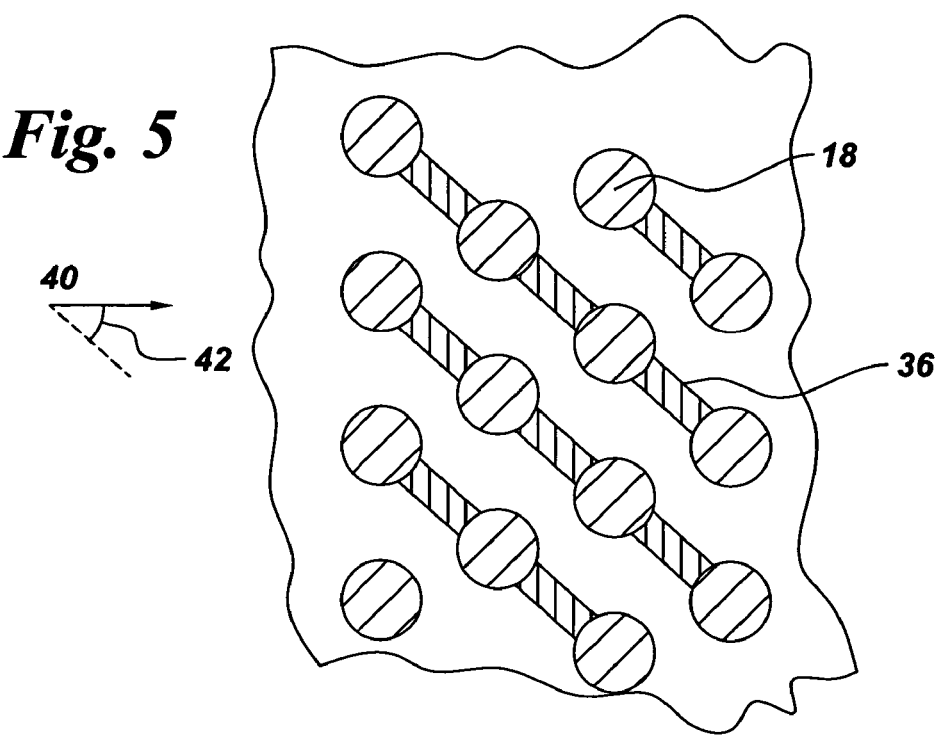
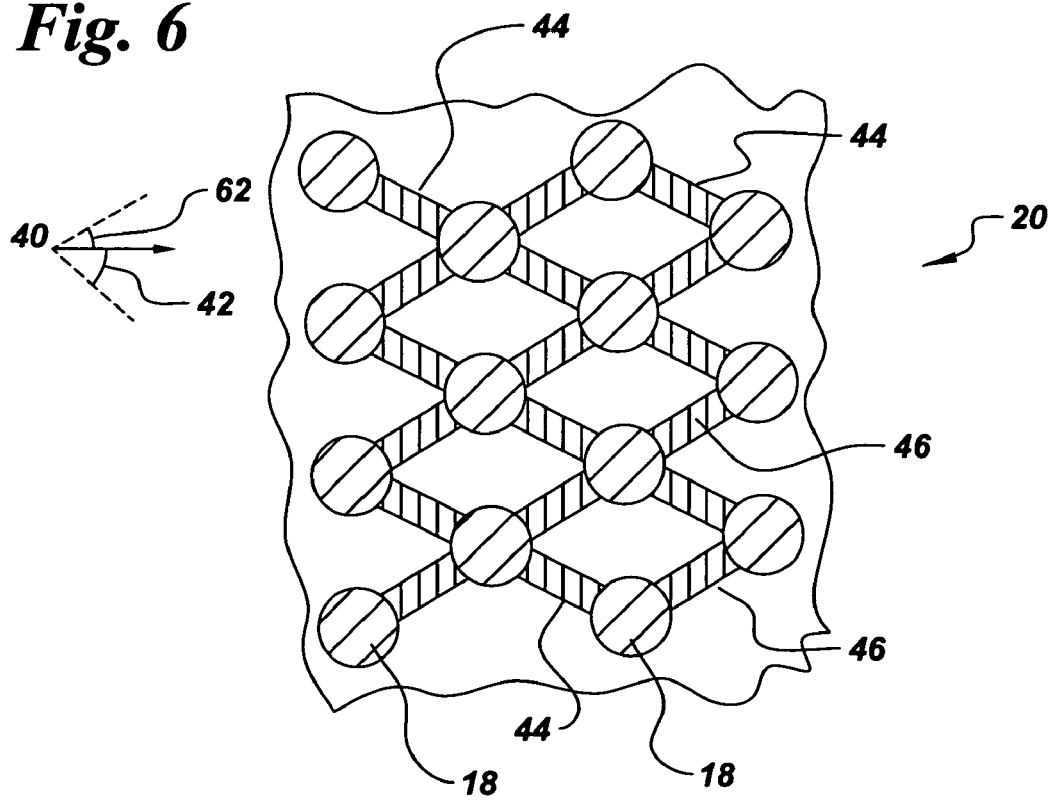

HOT GAS PATH COMPONENT WITH MESH AND TURBULATED COOLING

STATEMENT REGARDING FEDERALLY SPONSORED RESEARCH & DEVELOPMENT

This invention was made with Government support under contract number PRDA VII F33615-02-C-2212 awarded by the DOD. The Government has certain rights in the invention.

CROSS REFERENCE TO RELATED APPLICATIONS

This application is related to commonly assigned U.S. patent application Ser. No. 10/720,045, R. S. Bunker et al., entitled "Hot Gas Path Component with Mesh and Dimpled Cooling," which is filed concurrently herewith and is hereby incorporated by reference in its entirety.

BACKGROUND OF THE INVENTION

The invention relates generally to hot gas path components for turbine assemblies and, more particularly, to synergistic approaches to cool the hot gas path components.

Exemplary gas turbine engines are used for aircraft or stationary power applications, and engine efficiency is a key design criteria for both applications. The efficiency of gas turbine engines improves with increased temperature of the combustion gas flow. However, a limiting factor in the gas flow temperature is the high temperature capability of the various hot gas path components, such as the turbine stator and rotor airfoils. Stator airfoils are also known as vanes or nozzles, rotor airfoils are also known as blades or buckets.

Various approaches to cooling the hot gas path components have been proposed and implemented to increase the upper operating temperature of the engines. Several of these approaches are reviewed in commonly assigned U.S. Pat. No., 5,690,472, Lee, "Internal Cooling of Turbine Airfoil Wall Using Mesh Cooling Arrangement," which is incorporated herein by reference in its entirety. These cooling techniques typically involve bleeding compressed air off the compressor to serve as a coolant. However, by bypassing the compressed air around the engine's combustion zone to cool the hot gas path components, the overall efficiency of the engine is reduced. Accordingly, it is desirable to increase the cooling effectiveness of the hot gas path components, in order to improve overall engine efficiency.

One beneficial cooling technique is mesh cooling, as described, for example in U.S. Pat. No. 5,690,472, which is cited above, and in U.S. Pat. No. 5,370,499, Lee, "Film Cooling of Turbine Airfoil Wall using Mesh Cooling Hole Arrangement," which is also incorporated by reference herein in its entirety. However, a need for additional improvement in cooling of hot gas path components remains. This need is especially strong for cooling thin airfoil walls and/or regions of limited availability, such as the trailing edges of airfoils. Accordingly, it would be desirable to provide enhanced cooling effectiveness for hot gas components.

BRIEF DESCRIPTION

Briefly, in accordance with one embodiment of the present invention, a component is described. The component includes at least one wall having an inner portion and an outer portion. A number of pins extend between the inner and outer portions of the wall. The pins define a mesh cooling arrangement having a number of flow channels. A number of turbulators are disposed on at least one of the inner and outer portions of the wall.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is an enlarged longitudinal sectional view of another exemplary embodiment of the mesh cooling arrangement of FIG. 2 with angled turbulators;

FIG. 6 illustrates another exemplary mesh cooling arrangement with alternating segmented turbulators;

DETAILED DESCRIPTION

Figure 1:
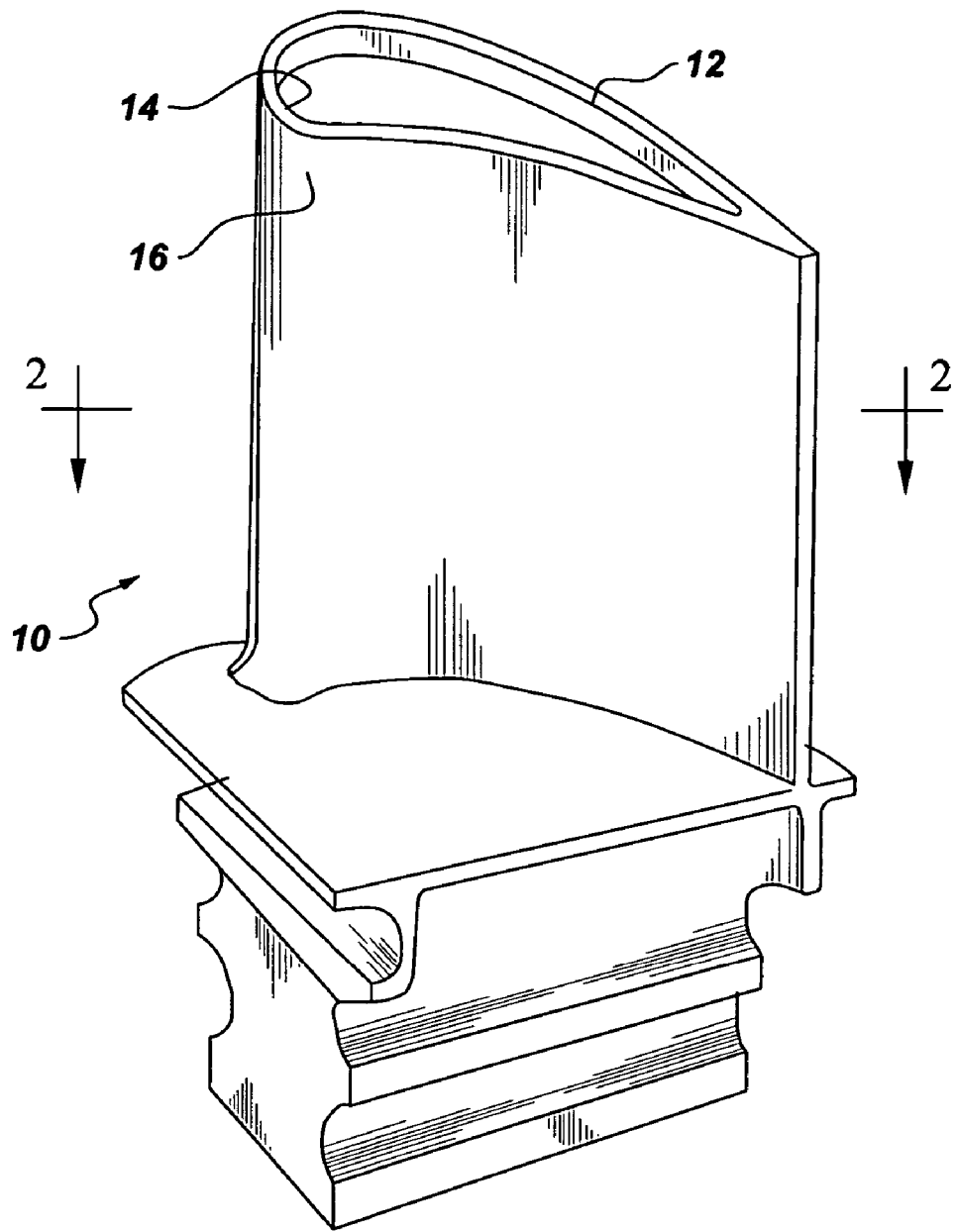
FIG. 1 shows an exemplary hot gas path component with an airfoil.
Figure 2:
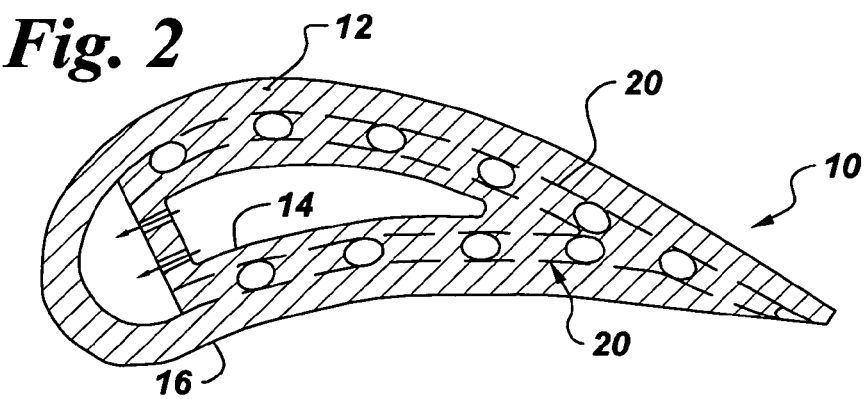
FIG. 2 is a cross-sectional view of the airfoil of FIG. 1, taken along line 2—2 of FIG. 1.

A component 10 embodiment of the invention is described with reference to FIGS. 1–4. Exemplary components include hot gas path components, such as blades, vanes, end walls, and shrouds. The invention is equally applicable to other portions of the stator and rotor assemblies, as well as to other hot sections such as after-burners. Moreover, the invention applies to various size and application gas turbines, such as aircraft engines and land-based power turbines. Conventional hot gas components are well known, as are mesh cooled hot gas path components. The component 10 shown is purely exemplary, and the invention is not limited to any particular component type. As shown, for example in FIGS. 1 and 2, the component 10 has at least one wall 12 having an inner portion 14 and an outer portion 16. As shown for example in FIGS. 3 and 4, the component 10 further includes a number of pins 18 that extend between the inner and outer portions 14, 16 of the component wall 12. The pins define a mesh cooling arrangement 20 that includes a number of flow channels 22. Exemplary pin shapes are rounded or sharp, depending on the manufacturing method. Exemplary pin shapes include cylindrical and rounded diamonds. The shape may be selected, in part, to obtain a more directional cooling flow, for example to enhance interaction with the other cooling enhancements, such as turbulators, which are discussed below. Investment casting produces a rounded pin, whereas sharper corners result from fabrication methods. The component 10 also includes a number of turbulators 36 disposed on at least one of the inner and outer portions 14, 16 of the component wall 12, as shown for example in FIGS. 3 and 4. According to three particular embodiments, the turbulators 36 are formed on the inner portion 14 of the wall 12, on the outer portion 16 of the wall 12, and on both the inner and outer portions 14, 16 of the wall 12.

Figure 4:
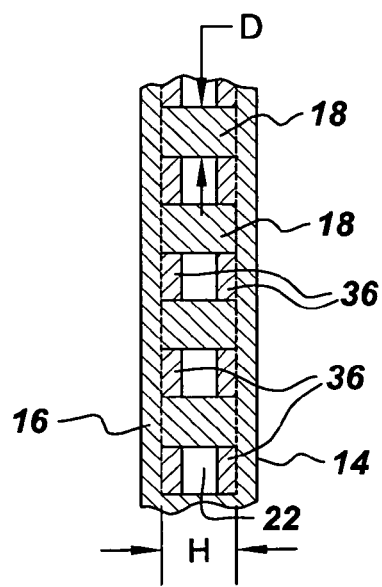
FIG. 4 is a longitudinal sectional view of the turbulated mesh cooling arrangement taken along line 4—4 of FIG. 3.

Traditional pin banks have high height-to-diameter (H/D) ratios that exceed two (2). The pin height H and diameter D are indicated in FIG. 4. In contrast, the pins 18 are characterized by a height-to-diameter ratio of about less than or equal to two H/D≦2.0, and more particularly, by a height-to-diameter ratio of about less than one (H/D<1.0), and still more particularly by a height-to-diameter ratio within a range of about 0.1 to about 0.3 (0.1≦H/D≦0.3). As a result, the pins 18 define a mesh cooling arrangement 20 (or "flow network mesh") with an overall blockage of about forty percent (40%) or greater. Blockage in this case refers to the percentage of the otherwise open flow channel cross-section area that is now occupied by the pins. By situating turbulators 36 in this mesh cooling arrangement 20, further disruption of the flow is achieved, which enhances heat transfer effectiveness. Beneficially, the turbulators 36 provide substantial flow disruption without significant material or weight addition. This facilitates a higher pin-to-pin spacing within the mesh cooling arrangement, which reduces the weight of the component 10. In addition, the enhanced heat transfer effectiveness resulting from the turbulated mesh cooling arrangement 20 facilitates the use of circular and other low pressure loss pins 18, resulting in acceptable total pressure losses at high thermal performance. By "circular," it is meant that the pins 18 have substantially circular cross-sections (as compared to a diamond shape, for example). Accordingly, exemplary circular pins are cylinders that extend between the inner and outer portions 14, 16 of the component wall 12. Other examples of low pressure loss pins include oval and elliptical pins. In addition to providing lower pressure losses, circular pins 18 are also desirable from an ease of manufacturing standpoint.

Figure 3:
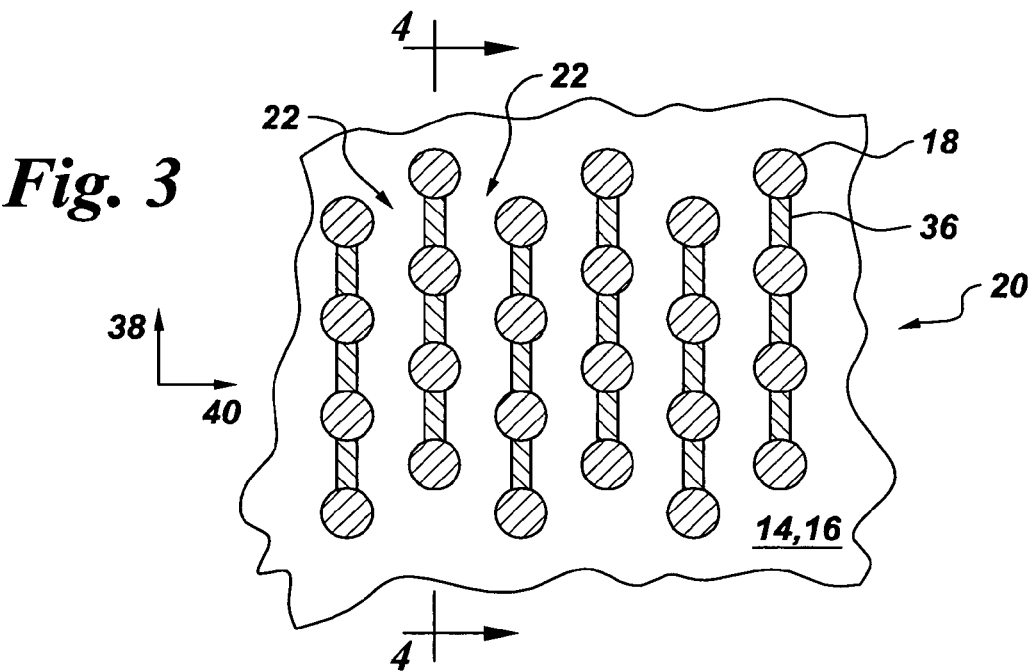
FIG. 3 is an enlarged longitudinal sectional view of an exemplary embodiment of the mesh cooling arrangement of FIG. 2 with transverse turbulators.

FIG. 3 illustrates a transverse turbulator arrangement. As shown, the turbulators 36 extend between respective pairs of pins 18 in a direction transverse 38 to a cooling flow 40. In addition to this transverse turbulator configuration, the turbulators 36 may also be arranged in an angled configuration. For example, FIG. 5 shows turbulators 36 that extend between respective pairs of pins 18 and are oriented at an angle 42 relative to a cooling flow 40. FIG. 6 illustrates an exemplary arrangement of "alternating segmented" turbulators 36, for which a first subset 44 of turbulators 36 extend between respective pairs of pins 18 and are oriented at an angle 42 relative to a cooling flow 40. A second subset 46 of turbulators 36 extend between respective pairs of pins 18 and are oriented at a second angle 62 relative to the cooling flow 40. For the exemplary embodiment of FIG. 6, the first and second angles 42, 62 intersect. By "intersecting angles," it is meant that the respective turbulators 36 in the first and second subsets 44 are not parallel. In other words, the respective turbulators 36 in the first subset 44 are oriented relative to the turbulators 36 in the second subset 46, such that they would intersect with their counterparts in the second subset 46 if they were long enough to do so. The precise relative orientation of members of the first and second subsets 44, 46 of turbulators 36 will vary based on the spacing between the pins 18, for example.

Figure 7:
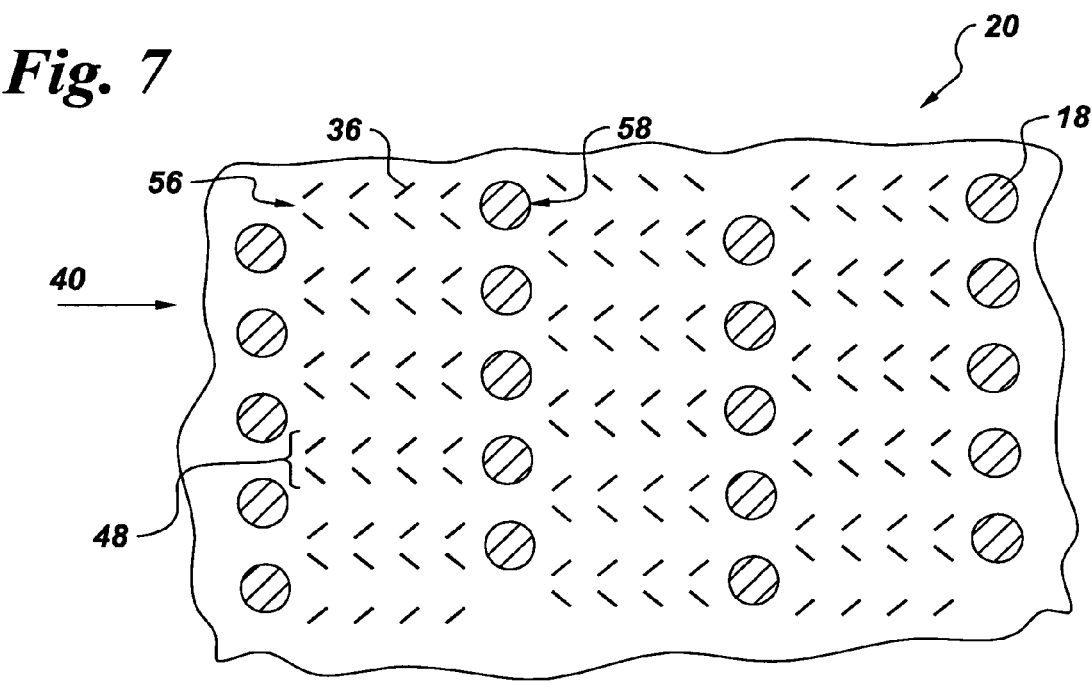
FIG. 7 illustrates an exemplary mesh cooling arrangement with segmented, chevron turbulators.

A chevron turbulator embodiment is described with reference to FIG. 7. As shown for example in FIG. 7, respective pairs of turbulators 36 form chevron turbulators 48 on the respective one of the inner and outer portions 14, 16 of the component wall 12. For the particular embodiment of FIG. 7, the chevron turbulators 48 are segmented chevron turbulators. Segmentation corresponds to an open apex 56, as shown in FIG. 7. Beneficially, segmentation, by providing an open apex 56, generates more effective fluid vortices. Convection along the angled direction of the turbulator segments 36 induces a kind of secondary vortical motion that is highly effective in thermal enhancements.

For the exemplary embodiment of FIG. 7, each of the chevron turbulators 48 has an apex 56 oriented upstream relative to the cooling flow 40. Other arrangements include at least one chevron turbulator 48 with an apex 56 oriented downstream relative to the cooling flow 40. In addition, the relatively dense segmented chevron pattern of FIG. 7 is purely exemplary, and less dense segmented patterns are also embraced by the invention.

Integrating a segmented chevron turbulator arrangement in a mesh cooling arrangement provides unique thermal enhancements. For example, the cooling flow 40 is accelerated through the gaps between neighboring pins 18, and the accelerated cooling flow then interacts with the open apex portion 56 of the chevron turbulator 48 to generate mixing and convecting vortices (not shown). Further, the chevron turbulators 48 enhance the interaction of the cooling flow with the downstream surface areas 58 of the pins 18. As a result of these synergies, the heat transfer is enhanced.

Figure 8:
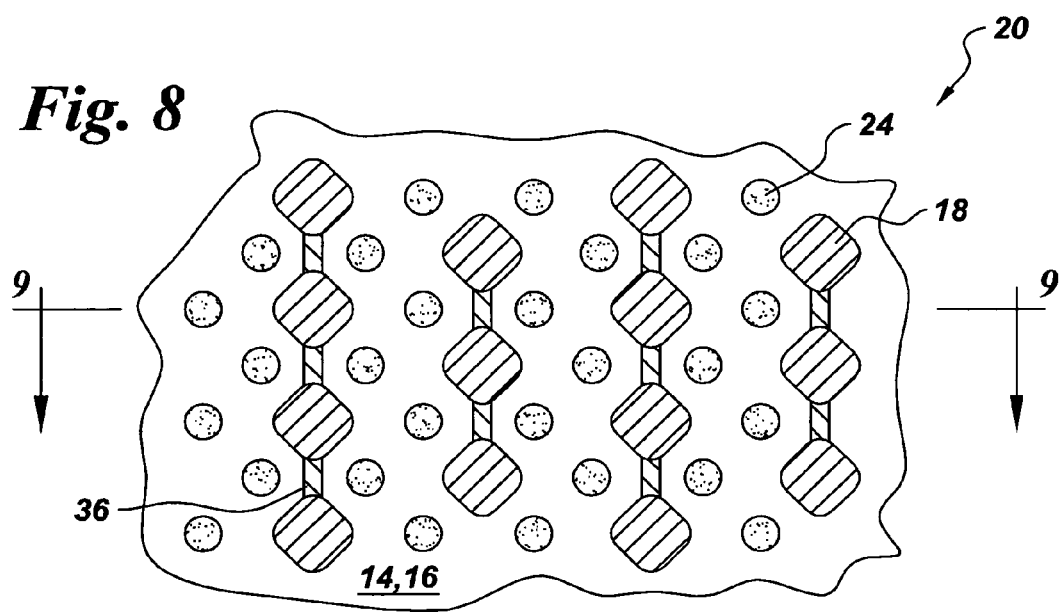
FIG. 8 shows an exemplary dimpled, turbulated mesh cooling arrangement.

A dimpled, turbulated embodiment is described with reference to FIG. 8. As shown for example in FIG. 8, the component 10 also includes a number of dimples 24 located in at least one of the inner and outer portions 14, 16 of the component wall 12. According to three particular embodiments, the dimples 24 are formed in the inner portion 14 of the wall 12, in the outer portion 16 of the wall 12, and in both the inner and outer portions 14, 16 of wall 12. Exemplary dimples 24 have a center depth of about 0.010 to about 0.030 inches and a surface diameter of about 0.010 to about 0.12 inches, for typical aircraft engine applications. For typical power system applications, exemplary dimples have a center depth of about 0.010 to about 0.060 inches and a surface diameter of about 0.010 to about 0.250 inches. The dimples 24 may be formed in a number of shapes. For the exemplary embodiment of FIGS. 3 and 4, the dimples 24 are concave and, more particularly, are hemispherical or hemispherical sections. Another exemplary dimple shape is a cone shape, including both a full or a truncated inverted cone. Beneficially, the dimples 24 set up fluid vortices in the cooling flow, which causes mixing near the component wall 12, thereby enhancing the heat transfer at the wall 12, as well as on the pin surfaces. In addition, the dimples 24 also increase surface area to help compensate for the area covered by the pins 18. In this manner, the present invention leverages different thermal enhancements in a synergistic approach.

Figure 9:
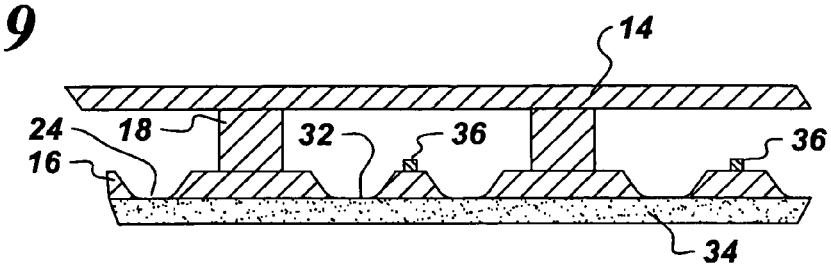
FIG. 9 illustrates an active-passive transpiration and convection embodiment of a dimpled, turbulated mesh cooling arrangement.

An active-passive transpiration and convection cooling embodiment is described with reference to FIG. 9, which is a longitudinal sectional view of an embodiment of the mesh cooling arrangement taken along line 9—9 of FIG. 8. For the exemplary embodiment of FIG. 9, the dimples 24 are located in the outer portion 16 of the wall 12, as shown. More particularly, at least one coating 34 is disposed on the outer portion 16 of the wall 12. An exemplary coating 34 is a thermal barrier coating 34. For the exemplary embodiment of FIG. 9, each of the dimples 24 shown extends through the outer portion 16 of the wall 12 to form respective cooling holes 32, and each of the cooling holes 32 shown is at least partially covered by the coating 34. Beneficially, by extending through the outer portion 16 of the wall 12, the dimples 24 provide film cooling for the component wall 12. More particularly, the dimples that extend through the outer portion 16 of the wall to form cooling holes 32 provide transpiration cooling, whereas the dimples 24 that do not extend through the outer portion of the wall (not expressly shown) provide convection.

Depending on the desired level of cooling and specific component characteristics, dimples 24 can be formed in either the inner or outer portions 14, 16 of the component wall 12 or in both the inner and outer portions 14, 16 of the wall 12, as noted above. Similarly, the dimples 24 can be formed of varying depth and/or diameter, such that some, all or none of the dimples extend through the respective inner and outer portions 14, 16 of the component wall 12. Where the dimples 24 extend through the respective inner or outer portion 14, 16 of the wall 12, they form cooling holes 32, providing transpiration cooling for the component wall 12. Where the dimples 24 do not extend through the respective inner or outer portion 14, 16 of the wall 12, they provide convection to help cool the component wall 12.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A component comprising:
   at least one wall having an inner portion and an outer portion;
   a plurality of pins extending between said inner and outer portions of said wall, wherein said pins define a mesh cooling arrangement comprising a plurality of flow channels; and
   a plurality of turbulators disposed on at least one of said inner and outer portions of said wall.

2. The component of claim 1, wherein said pins are characterized by a height-to-diameter ratio of about less than or equal to two ($H/D \leq 2.0$).

3. The component of claim 2, wherein said pins are characterized by a height-to-diameter ratio of about less than one ($H/D < 1.0$).

4. The component of claim 3, wherein said turbulators are formed on only one of said inner and outer portions of said wall.

5. The component of claim 3, wherein said turbulators are formed on both of said inner and outer portions of said wall.

6. The component of claim 3, wherein said turbulators extend between respective pairs of said pins in a direction transverse to a cooling flow.

7. The component of claim 3, wherein said turbulators extend between respective pairs of said pins (18) and are oriented at an angle relative to a cooling flow.

8. The component of claim 3, wherein a first subset of said turbulators extend between respective pairs of said pins and are oriented at a first angle relative to a cooling flow, wherein a second subset of said turbulators extend between respective pairs of said pins and are oriented at a second angle relative to the cooling flow, and wherein the first and second angles intersect.

9. The component of claim 3, wherein respective pairs of turbulators form chevron turbulators on the respective one of said inner and outer portions of said wall.

10. The component of claim 9, wherein at least one of said chevron turbulators has an apex oriented upstream relative to a cooling flow.

11. The component of claim 10, wherein each of said chevron turbulators has an apex oriented upstream relative to a cooling flow.

12. The component of claim 9, wherein at least one of said chevron turbulators has an apex oriented downstream relative to a cooling flow.

13. The component of claim 3, wherein said pins are characterized by a height-to-diameter ratio within a range of about 0.1 to about 0.3 ($0.1 \leq H/D \leq 0.3$).

14. The component of claim 13, further comprising a plurality of dimples located in at least one of said inner and outer portions of said wall.

15. The component of claim 3, wherein said pins are circular.

16. The component of claim 14, wherein said dimples are located in both of said inner and outer portions of said wall.

17. The component of claim 14, wherein said dimples are located in said outer portion of said wall.

18. The component of claim 17, further comprising at least one coating on said outer portion of said wall.

19. The component of claim 18, wherein said coating comprises a thermal barrier coating.

20. The component of claim 18, wherein at least one of said dimples extends through said outer portion of said wall to form a cooling hole, and wherein said coating at least partially covers said cooling hole.

21. The component of claim 14, wherein each of said dimples has a center depth of about 0.010 to about 0.030 inches and a surface diameter of about 0.010 to about 0.12 inches.

22. The component of claim 14, wherein at least one of said dimples extends through the respective one of said inner and outer portions of said wall to form a cooling hole.

23. The component of claim 14, wherein none of said dimples extend through said inner and outer portions of said wall.

24. A hot gas path component comprising:
    at least one wall having an inner portion and an outer portion;
    a plurality of pins extending between said inner and outer portions of said wall, wherein said pins define a mesh cooling arrangement comprising a plurality of flow channels, wherein said pins are characterized by a height-to-diameter ratio within a range of about 0.1 to about 0.3 ($0.1 \leq H/D \leq 0.3$); and
    a plurality of turbulators disposed on at least one of said inner and outer portions of said wall.

25. The hot gas path component of claim 24, wherein said turbulators extend between respective pairs of said pins in a direction transverse to a cooling flow.

26. The hot gas path component of claim 24, wherein said turbulators extend between respective pairs of said pins and are oriented at an angle relative to a cooling flow.

27. The hot gas path component of claim 24, wherein a first subset of said turbulators extend between respective pairs of said pins and are oriented at a first angle relative to a cooling flow, wherein a second subset of said turbulators extend between respective pairs of said pins and are oriented at a second angle relative to the cooling flow, and wherein the first and second angles intersect.

28. The component of claim 24, wherein respective pairs of turbulators form chevron turbulators on the respective one of said inner and outer portions of said wall.

29. The component of claim 24, further comprising a plurality of dimples located in at least one of said inner and outer portions of said wall.

* * * * *